United States Patent [19]

Grois et al.

[11] Patent Number: 5,282,259
[45] Date of Patent: Jan. 25, 1994

[54] OPTICAL FIBER ALIGNMENT DEVICE

[75] Inventors: Igor Grois, Northbrook; Ilya Makhlin, Skokie; Mark Margolin, Lincolnwood, all of Ill.

[73] Assignee: Molex Incorporated, Lisle, Ill.

[21] Appl. No.: 976,833

[22] Filed: Nov. 16, 1992

[51] Int. Cl.$^5$ .................................. G02B 6/36
[52] U.S. Cl. .................................. 385/84; 385/67; 385/88; 385/147
[58] Field of Search ............ 385/53, 55, 56, 59, 385/60, 66, 67, 68, 76, 78, 84, 88, 89, 90, 91, 147

[56] References Cited

U.S. PATENT DOCUMENTS

| | | | |
|---|---|---|---|
| 3,800,388 | 4/1974 | Börner et al. | 385/67 |
| 4,759,600 | 7/1988 | Caron et al. | 350/96.21 |
| 4,767,360 | 8/1988 | Bonhomme | 439/593 |
| 4,955,976 | 9/1990 | Freeman et al. | 385/55 |

OTHER PUBLICATIONS

PCT Publication, E. I. Du Pont de Nemours & Co., Gargiulo et al. Publication No. WO 90/14607; Nov. 29, 1990.

Primary Examiner—Rodney B. Bovernick
Assistant Examiner—John Ngo
Attorney, Agent, or Firm—A. A. Tirva

[57] ABSTRACT

An optical fiber alignment device is provided for aligning an optical fiber ferrule which has a geometric axis which may or may not be coincident with the optical axis of the fiber therewithin, with a cylindrical optical transmitter/receiver component which has a geometric axis which may or may not be coincident with the optical axis of the component. The adaptor includes a first end for receiving the ferrule and a second end for embracing the cylindrical optical component. The first end has a geometric axis generally coincident with the geometric axis of the ferrule, and the second end has a geometric axis generally coincident with the geometric axis of the cylindrical optical component. The first and second ends of the adaptor are eccentric to each other, thereby offsetting the respective geometric axes thereof. Therefore, rotation of the adaptor about the cylindrical transmitter/receiver component allows for alignment optimization between the optical axes of the component and the optical fiber ferrule.

3 Claims, 1 Drawing Sheet

OPTICAL FIBER ALIGNMENT DEVICE

FIELD OF THE INVENTION

This invention is directed generally to the art of fiber optic connection devices and, particularly, to an optical fiber alignment adaptor for aligning an optical fiber ferrule with a cylindrical optical transmitter/receiver component.

BACKGROUND OF THE INVENTION

Fiber optic alignment devices are well known and are used for aligning the ends of a pair of optical fibers or a fiber end with a light emitting or receiving component. Quite often, an optical fiber end is terminated in a ferrule which, itself, it aligned with another ferrule at a fiber end or with the light emitting/receiving component.

A typical optical fiber alignment device or adaptor includes an alignment sleeve having two ends. If the adaptor is aligning a pair of ferrules terminated to a pair of fiber ends, the two ends of the sleeve are of the same diameter. If the adaptor is aligning a ferrule with a cylindrical light emitting/receiving component, quite often the opposite ends of the sleeve are of different diameters.

Problems have been encountered in the use of optical fiber alignment adaptors or sleeves of the character described above. The problems are based on the fact that the geometric axes of the interconnected or aligned ferrules and/or light emitting/receiving components often do not coincide with the optical axes thereof. More particularly, the opposite ends of the alignment adaptor conventionally are press fit onto a cylindrical portion of a ferrule and onto the cylindrical light emitting/receiving component, and the geometric axes of the adaptor ends generally coincide with the geometric axes of the ferrule and the component. However, the optical axis of the component, particularly, often is not coincident with its geometric axis.

For instance, the light emitting/receiving component may be a light emitting diode which includes a can having a projecting portion defining the geometric axis. The optical axis often is not coincident with the geometric axis of the cylindrical portion because of the large tolerances involved during manufacture. In other words, the optical axis and the geometric axis of the component are eccentric relative to each other. Although the centering of an optical fiber end in a ferrule has become fairly precise in the industry, there also can be some eccentricity between the optical axis (the fiber) and the geometric axis of the ferrule. Therefore, transmission losses occur when using such optical fiber alignment adaptors because of the eccentricity of the optical axes of the interconnected optical components.

This invention is directed to solving the problems identified above by providing an adaptor which achieves alignment optimization between the axes of an optical fiber ferrule and a cylindrical transmitter/receiver component.

SUMMARY OF THE INVENTION

An object, therefore, of the invention is to provide a new and improved sleeve-type optical fiber alignment adaptor for aligning an optical fiber ferrule with a cylindrical optical transmitter/receiver component.

In accordance with the invention, it is understood that an optical fiber ferrule includes a geometric axis which may or may not be coincident with the optical axis of the fiber therewithin. The cylindrical optical transmitter/receiver component also has a geometric axis which may or may not be coincident with the optical axis of the component, but, most often, the geometric and optical axes of such components are eccentric.

In the exemplary embodiment of the invention, the optical fiber alignment adaptor includes a first end for receiving the optical fiber ferrule and a second end for embracing the cylindrical optical transmitter/receiver component. The first end has a geometric axis generally coincident with the geometric axis of the ferrule. The second end has a geometric axis generally coincident with the geometric axis of the optical component.

The invention contemplates an improvement wherein the first and second ends of the optical fiber alignment adaptor are eccentric to each other thereby offsetting the geometric axes thereof. Therefore, rotation of the adaptor (and the optical fiber ferrule therein) about the cylindrical optical component allows for alignment optimization between the optical axes of the component and the ferrule.

As disclosed herein, the first and second ends of the adaptor are formed by first and second cylindrical sleeves. At least one of the sleeves includes a first slot extending longitudinally thereof and a second slot extending transversely thereof, with the slots communicating with each other and providing a gripping resiliency for the sleeve. In the exemplary embodiment, the sleeves are of different diameters and both sleeves include the first and second slots whereby the gripping resiliency of one sleeve is independent from that of the other sleeve. Wall means axially separate the sleeves, with the second slots being located on opposite sides of the wall means. The wall means include a central aperture for the passage of optical signals or light therethrough.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENTS

Figure 1:
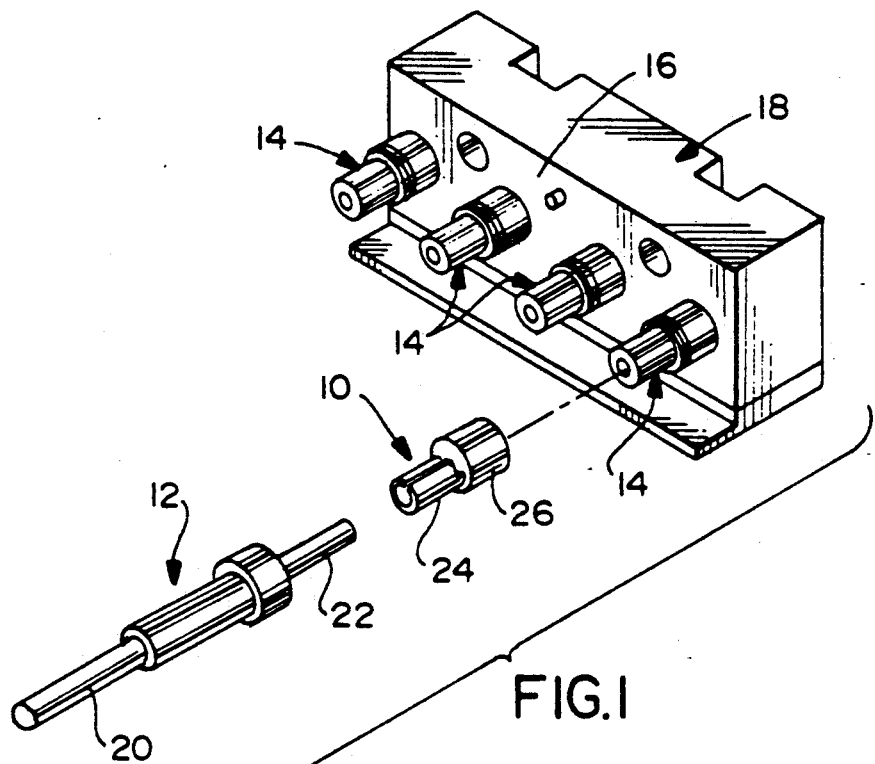
FIG. 1 is an exploded perspective view including an optical fiber alignment adaptor according to the invention, in conjunction with an optical fiber ferrule at the end of an optical fiber and an optical transmitter/receiver component.

Referring to the drawings in greater detail, and first to FIG. 1, the invention is embodied in an optical fiber alignment adaptor, generally designated 10, for aligning an optical fiber ferrule, generally designated 12, with a cylindrical optical transmitter/receiver component, generally designated 14. FIG. 1 shows a plurality (four) of the cylindrical optical transmitter/receiver components 14 projecting forwardly of a panel 16 which may be part of an electrical apparatus, generally designated 18, for instance. Although only one adaptor 10 and ferrule 12 are shown in the drawings, four adaptors and interconnected ferrules may be coupled to all four components 14 of the electrical apparatus 18. In addition, it should be understood that electrical apparatus 18 is illustrated for exemplary purposes, and cylindrical optical transmitter/receiver components 14 may be parts of a wide variety of optical transmitters, receivers or transceivers.

Optical fiber ferrule 12 is of a well known construction for coupling to the end of a cladded optical fiber 20. The fiber is stripped of its cladding within the ferrule, and an exposed fiber length is disposed in a cylindrical, forwardly projecting portion 22 of the ferrule, with the fiber end exposed at the distal end of forwardly projecting portion 22. Such ferrules have become relatively reliable, whereby the geometric axis of the ferrule, particularly the geometric axis of forwardly protruding cylindrical portion 22, is close to the optical axis of the ferrule, i.e. the fiber itself. However, there are instances wherein the geometric and optical axes of ferrule 12, particularly forwardly protruding cylindrical portion 22, are not coincident. More often, the geometric axes of cylindrical optical transmitter/receiver components 14 are not coincident with the optical axes thereof. Therefore, it is not uncommon to incur transmission losses when adaptors of the prior art are used to couple ferrule 12 to optical components such as cylindrical optical transmitter/receiver components 14. Adaptor 10 of this invention is directed to solving such problems and allowing for alignment optimization between the optical axes of the ferrule and the cylindrical optical component.

Figures 2, 3:
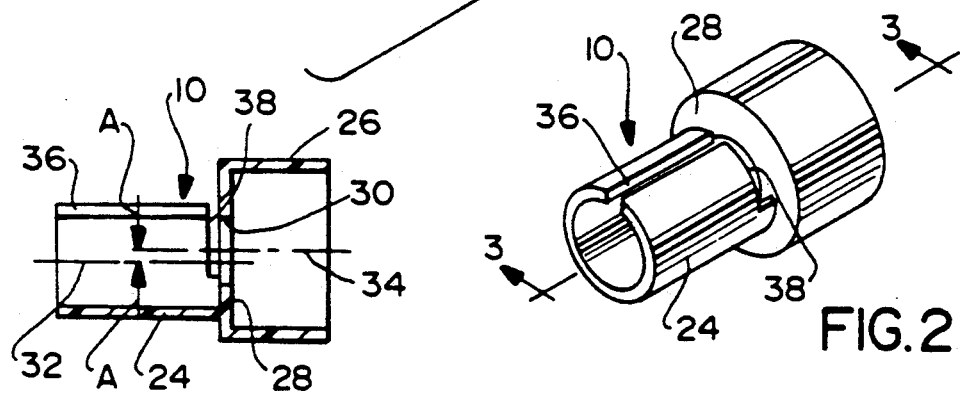
FIG. 2 is a perspective view, on an enlarged scale, of the adaptor shown in FIG. 1.
FIG. 3 is an axial section taken generally along line 3—3 of FIG. 2.

More particularly, referring to FIGS. 2 and 3, optical fiber alignment adaptor 10 includes a cylindrical sleeve 24 at a first end thereof and a cylindrical sleeve 26 at a second or opposite end thereof. Sleeve 24 is sized to receive and be press-fit onto forwardly projecting cylindrical portion 22 of ferrule 12. Sleeve 26 is sized for embracing and press-fitting onto one of the cylindrical optical components 14. It can be seen that sleeves 24 and 26 are of different diameters corresponding to the different diameters of the ferrule portion and the cylindrical optical component. Larger sleeve 26 has a bottoming wall 28 which separates the sleeves. The wall will abut against the distal end of one of the cylindrical optical components 14, and the wall has a central aperture 30 for the passage of optical signals or light therethrough.

Referring specifically to FIG. 3, sleeve 24 of adaptor 10, for coupling to ferrule 12, includes a geometric axis 32 defining the center-line of the cylindrical configuration of the sleeve. Similarly, larger sleeve 26 has a geometric axis 34 which defines the centerline of the cylindrical configuration of the sleeve. At this point, it should be understood that, while sleeve 26 is larger or has a greater diameter than sleeve 24, the reverse can be true or the sleeves can have the same diameters. In addition, with cylindrical sleeves 24 and 26 positioned over and embracing forwardly projecting cylindrical portion 22 of ferrule 12 and cylindrical optical component 14, respectively, the geometric axes of the sleeves are coincident with the geometric axes of the respective ferrule or component. However, the optical axes of the ferrule or the component, as described above, may or may not be coincident with the respective geometric axes. With many optical components, such as cylindrical optical transmitter/receiver components 14, quite often the geometric and optical axes thereof will not be coincident.

The invention contemplates that sleeves 24 and 26 at opposite ends of adaptor 10 be eccentric to each other and, thereby, offset the respective geometric axes 32 and 34 thereof, as indicated by arrows "A" in FIG. 3. Therefore, by rotating adaptor 10 about a cylindrical transmitter/receiver component, such as cylindrical optical component 14, alignment optimization can be achieved between the optical axes of the component and the ferrule which is coupled to sleeve 24. In other words, geometric axis 34 of sleeve 26 defines the axis of rotation of the adaptor. That axis of rotation remains fixed relative to the optical axis of the component to which sleeve 26 is coupled and rotated about. However, as sleeve 26 rotates about the cylindrical optical component, sleeve 24, particularly its geometric axis 32, orbits about geometric axis 34 of sleeve 26 and, likewise, the geometric axis of its coupled optical component. If it is assumed, for instance, that the optical axis of ferrule 12 is coincident with the geometric axis 32 of sleeve 24, it can be understood that the optical axis of the ferrule/fiber will be moved rotationally toward or away from the optical axis of the component coupled to sleeve 26, wherever that optical axis may be. At some point in the rotating circle or path, the optical axes will be at their closest point which can be considered the alignment optimization between the optical axes of the component and the ferrule.

In the form of the invention shown in FIGS. 2 and 3, sleeve 24 for ferrule 12 is provided with a gripping resiliency or spring action to facilitate press-fitting the adaptor onto forwardly projecting cylindrical portion 22 of the ferrule. More particularly, sleeve 24 includes a longitudinally extending slot 36 communicating with a transversely or radially extending slot 38 immediately adjacent wall 28 of sleeve 26.

Figure 5:
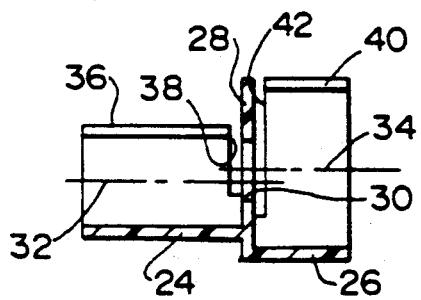
FIG. 5 is an axial section taken generally along line 5—5 of FIG. 4.
Figure 4:
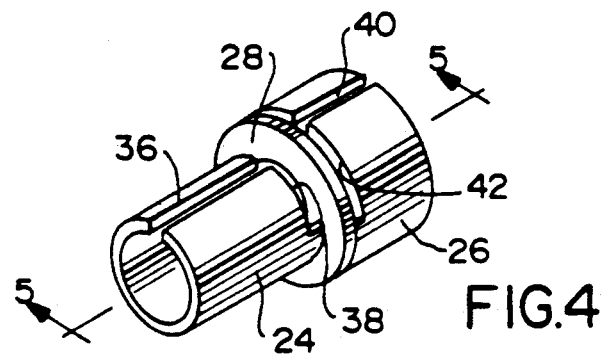
FIG. 4 is a perspective view of an alternate embodiment of the adaptor.

FIGS. 4 and 5 show an alternate embodiment of the invention wherein sleeve 26 also is provided with a spring action or gripping resiliency for facilitating press-fitting the adaptor over one of the cylindrical optical transmitter/receiver components 14. More particularly, like sleeve 24, sleeve 26 includes a longitudinally extending slot 40 communicating with a transversely or radially extending slot 42 immediately adjacent wall 28 which forms the bottom of sleeve 26. In the construction of FIGS. 4 and 5, it can be understood that the resiliency or the spring action afforded by sleeve 24 is independent from that afforded by sleeve 26.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. In an optical fiber alignment device for aligning an optical fiber ferrule which has a geometric axis which may or may not be coincident with the optical axis of the fiber therewithin, with a cylindrical optical transmitter/receiver component which has a geometric axis which may or may not be coincident with the optical axis of the component, the device including a first cylindrical sleeve for receiving the ferrule and a second cylindrical sleeve for embracing the cylindrical optical component, the first cylindrical sleeve having a geometric axis generally coincident with the geometric axis of the ferrule, and the second cylindrical sleeve having a geometric axis generally coincident with the geometric axis of the cylindrical optical component, said first and second sleeves of the device being eccentric to each other thereby offsetting the respective geometric axes thereof, whereby rotation of the device about the cylindrical transmitter/receiver component allows for alignment optimization between the optical axes of the transmitter/receiver component and optical fiber of the ferrule, wherein said sleeves are of different diameters and each of said sleeves includes a first slot extending longitudinally thereof and a second slot extending transversely thereof, the slots communicating with each other and providing a gripping resiliency for each sleeve independent from that of the other sleeve, the device including a wall means axially separating said sleeves, said second slots being located on opposite sides of the wall means, and the wall means including a central aperture for the passage of optical signals therethrough.

2. In an optical fiber alignment device for aligning a first optical component which has a geometric axis which may or may not be coincident with the optical axis thereof with a cylindrical second optical component which has a geometric axis which may or may not be coincident with the optical axis thereof, the device including a first end for receiving the first component and a second end for receiving the second component, the first end having a geometric axis generally coincident with the geometric axis of the first component, and the second end having a geometric axis generally coincident with the geometric axis of the second component, said first and second ends of the device being eccentric to each other thereby offsetting the geometric axes thereof, whereby rotation of the device about the cylindrical second component allows for alignment optimization between the optical axes of the two components, and a wall means axially separating said first and second ends of said device, the wall means including a central aperture for the passage of optical signals therethrough.

3. In an optical fiber alignment device for aligning an optical fiber ferrule which has a geometric axis which may or may not be coincident with the optical axis of the fiber therewithin, with a cylindrical optical transmitter/receiver component which has a geometric axis which may or may not be coincident with the optical axis of the component, the device including a first cylindrical sleeve for receiving the ferrule and a second cylindrical sleeve for embracing the cylindrical optical component, the first cylindrical sleeve having a geometric axis generally coincident with the geometric axis of the ferrule, and the second cylindrical sleeve having a geometric axis generally coincident with the geometric axis of the cylindrical optical component, said first and second sleeves of the device being eccentric to each other thereby offsetting the respective geometric axes thereof, whereby rotation of the device about the cylindrical transmitter/receiver component allows for alignment optimization between the optical axes of the transmitter/receiver component and optical fiber of the ferrule, wherein at least one of said sleeves includes a first slot extending longitudinally thereof and a second slot extending transversely thereof, the slots communicating with each other and providing a gripping resiliency for the one of said sleeves, and a wall means axially separating said sleeves, the wall means including a central aperture for the passage of optical signals therethrough.

* * * * *